US008249797B2

(12) United States Patent
Chuang

(10) Patent No.: US 8,249,797 B2
(45) Date of Patent: Aug. 21, 2012

(54) POSITIONING SYSTEM AND CONTROL METHOD THEREOF

(75) Inventor: Chung-Hsien Chuang, Taipei County (TW)

(73) Assignee: Mitac International Corp., Taoyuan (TW)

( * ) Notice: Subject to any disclaimer, the term of this patent is extended or adjusted under 35 U.S.C. 154(b) by 573 days.

(21) Appl. No.: 11/847,705

(22) Filed: Aug. 30, 2007

(65) Prior Publication Data

US 2008/0059066 A1   Mar. 6, 2008

(30) Foreign Application Priority Data

Aug. 31, 2006  (TW) ............................. 95132222 A

(51) Int. Cl.
*G01C 21/00* (2006.01)

(52) U.S. Cl. ...................................................... 701/213

(58) Field of Classification Search .............. 701/1, 200, 701/207, 213, 214, 300; 340/988, 995.1, 340/995.12, 995.25, 995.28; 342/350, 352, 342/357.01, 357.02, 357.06, 357.09, 357.1, 342/357.12, 357.13, 357.17, 358.08
See application file for complete search history.

(56) References Cited

U.S. PATENT DOCUMENTS

| 5,528,248 | A | * | 6/1996 | Steiner et al. ............. 342/357.31 |
| 5,832,247 | A | * | 11/1998 | Gildea et al. .................. 710/306 |
| 5,861,841 | A | * | 1/1999 | Gildea et al. ............. 342/357.31 |
| 6,078,290 | A | * | 6/2000 | McBurney et al. ........... 342/417 |
| 7,333,054 | B2 | * | 2/2008 | Ueno et al. ............... 342/357.74 |
| 2006/0208942 | A1 | * | 9/2006 | Vyas et al. ............... 342/357.09 |
| 2007/0118283 | A1 | * | 5/2007 | Jendbro ........................ 701/213 |
| 2007/0162230 | A1 | * | 7/2007 | Lin ............................... 701/213 |

* cited by examiner

*Primary Examiner* — Thomas Tarcza
*Assistant Examiner* — Nagi Murshed
(74) *Attorney, Agent, or Firm* — Wang Law Firm, Inc.; Li K. Wang

(57) ABSTRACT

A positioning system includes a positioning module, an application program, a control program, a first transmission interface, a second transmission interface and a switch module. The positioning module is for providing positioning information. The application program is for controlling the positioning module to receive the positioning information from the positioning module. The control program is for controlling the positioning module to receive the positioning information from the positioning module when the application program is shutdown. The application program receives the positioning information through the first transmission interface. The control program receives the positioning information through the second transmission interface. The switch module can be selectively switched to decide whether the positioning module is controlled by the application program or the control program to receive the positioning information.

10 Claims, 6 Drawing Sheets

US 8,249,797 B2

POSITIONING SYSTEM AND CONTROL METHOD THEREOF

FIELD OF THE INVENTION

The present invention relates to a positioning system and a control method thereof, and more particularly to a positioning system that updates ephemeris data by a control program when a navigation program is terminated, for the purpose of reducing the positioning time.

BACKGROUND OF THE INVENTION

Global positioning system, abbreviated GPS, is the plan of precise satellite navigation system developed by the United States, and the GPS includes 26 satellite vehicles distributed and operated among six orbits, and each orbit has approximately 55 degrees inclination with respect to Earth's equator, such that an operator using GPS on Earth can receive the signals from 4~8 satellites anytime and anywhere, if the signals are not blocked by terrain or construction, regardless of weather conditions and calculate current position based on the signals. With such space technology, any operator using GPS can obtain accurate his own location, speed and local time easily.

The GPS development project was held by the U.S. Department of Defense for military purpose in beginning. With participation of the U.S. Department of Transportation, the technology was transferred for civilian use and applied in operations such as navigation and positioning, precision measurement and standard time. GPS is a navigation system that integrates satellite and wireless technologies to provide a user's precise location, speed and local time. GPS is used extensively, and many GPS technologies and business opportunities are developed rapidly as satellite technologies advance. At early stage, GPS was intended for military units and used for military purposes such as the precision positioning of air fighters, ships, motor vehicles, staffs and targets. Till now, GPS is free for civilian use and applied in the positioning, and such technology of integrating the space satellites and the communication technology is developed rapidly. In addition to the precise positioning function, the GPS also can be added on more functionality to provide accurate information of speed, direction and distance. The applicability scope of GPS is very extensive, and thus it creates lots of business opportunities.

However, the navigation equipments for GPS must be located in an open area where the sky and surroundings do not have any obstacle to receive satellite signals transmitted from a GPS satellite by a GPS antenna to download ephemeris data. After obtaining sufficient ephemeris data, the navigation equipments can complete a first-time positioning, and the aforementioned process is called "Cold Start". The positioning process usually takes about 45 seconds to 2 minutes, or more time for regions with a poor signal reception.

However, the downloaded GPS ephemeris data is time-sensitive, because the GPS satellites in the sky are not fixed, and the same GPS satellite travels around the world twice per day. For example, all GPS ephemeris data of a SiRF GPS module come with an expiration time about four hours, and if the data is not updated within four hours, then the original GPS ephemeris data will no longer have the value of serving as a reference anymore. Therefore, the navigation equipment must perform a cold start again, but it is time consuming to periodically perform the necessary process of updating GPS ephemeris data.

In recent two years, some designs used a Global System for Mobile Communications (GSM) mobile phone with a general packet radio service (GPRS) for the positioning process. The major difference between a so-called assisted global positioning system (AGPS) and a conventional GPS resides on that the GPS only uses satellites for the positioning process, and the first-time positioning process and each positioning process thereafter take a long time, but the AGPS roughly searches the user's location through the GSM base station first, and then uses GPS satellites for precise positioning. The AGPS not only saves the time for the first-time positioning process, but also reduces the time consumed by the conventional GPS for each positioning thereafter from one minute to ten seconds, and overcomes the existing drawback of unable to receive signals from the satellite indoors.

Although the AGPS can improve the drawback of wasting too much time on updating the ephemeris data of a conventional GPS, yet the AGPC requires a mobile phone with the AGPS function and a telecommunication service which is provided by a telecommunication company. Furthermore, the telecommunication company will charge users for transmitting GPRS packets, and thus an additional cost is incurred.

In view of the drawbacks of the prior art, the inventor of the present invention based on years of experience in the related industry to conduct extensive researches and experiments, and finally invented a positioning system and a control method thereof to expedite the positioning time through this system without incurring additional hardware cost.

SUMMARY OF THE INVENTION

Therefore, it is a primary objective of the present invention to provide a positioning system and control method thereof, and more particularly a positioning system that is controlled by a control program when the navigation program is terminated, to updates its ephemeris data in order to short the positioning time.

To achieve the foregoing objective, a positioning system of the present invention is disclosed. And the positioning system comprises a positioning module, an application program, a control program, a first transmission interface, a second transmission interface and a switch module. The positioning module is for providing positioning information. The application program is for controlling the positioning module to receive the positioning information. The control program is for controlling the positioning module to receive the positioning information when the application program is terminated. The first transmission interface is provided for the application program to receive the positioning information, and the second transmission interface is provided for the control program to receive the positioning information. The switch module selectively switches to a first state or a second state, such that if the switch module is situated at the first state, the application program drives the switch module to receive the positioning information from the positioning module through the first transmission interface, and the application program can receive the positioning information, or if the switch module is situated at the second state, then the control program drives the switch module to receive the positioning information from the positioning module through the second transmission interface, and the control program can receive the positioning information.

Since the positioning system of the present invention and the control method thereof provide an innovative positioning module control architecture, the navigation program and the control program can access the same positioning information in the same period. In detail, the access of the positioning information through the serial ports is controlled by the positioning module which is switched to support the control program and to support the navigation program in turn by a switch module, therefore the navigation program and the control program can access a single positioning module at a period for reading the positioning information from the positioning module, such that the control program can timely update the ephemeris data, without waiting till the navigation program has turned off the serial port of the positioning module. Therefore, the present invention can provide an additional control flow to work with the existing positioning software without changing the existing navigation software, so as to short the positioning time of the positioning module.

To make it easier for our examiner to understand the objective of the invention, its structure, innovative features, and performance, we use a preferred embodiment together with the attached drawings for the detailed description of the invention.

DETAILED DESCRIPTION OF THE PREFERRED EMBODIMENTS

Figure 1:
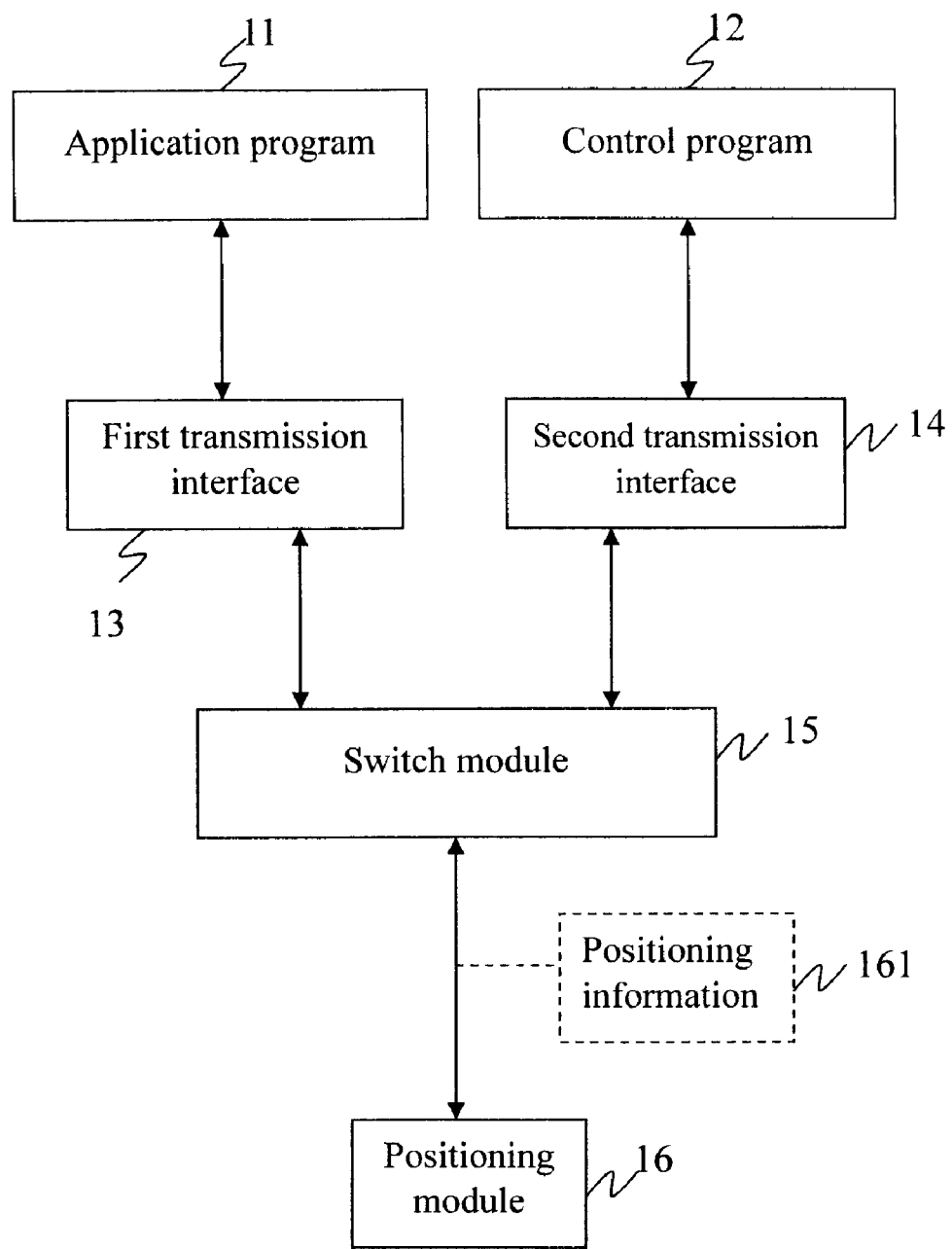
FIG. 1 is a block diagram of a positioning system in accordance with the present invention.

In the following related figures, same reference numerals are used for the same elements of a positioning system and a control method in accordance with a preferred embodiment of the present invention.

Referring to FIG. 1 for a block diagram of a positioning system in accordance with the present invention, the positioning system comprises a positioning module 16, an application program 11, a control program 12, a first transmission interface 13, a second transmission interface 14 and a switch module 15. The positioning module 16 is for providing positioning information 161. The application program 11 is for receiving the positioning information 161 from the positioning module 16. The control program 12 is for receiving the positioning information 161 from the positioning module 16 when the application program 11 is terminated. The first transmission interface 13 is provided for the application program 11 to receive the positioning information 161, and the second transmission interface 14 is provided for the control program 12 to receive the positioning information 161. The switch module 15 selectively switches to a first state or a second state, such that if the switch module 15 is situated at the first state, the application program 11 uses the first transmission interface 13 to receive the positioning information 161 from the positioning module 16 through the switch module 15 so that the application program 11 can receive the positioning information 161, or if the switch module 15 is at the second state, the control program 12 uses the second transmission interface 14 to receive the positioning information 161 from the positioning module 16 through the switch module 15 so that the control program 12 can receive the positioning information 161.

Preferably, the application program is a navigation program, and the positioning module is a GPS module, and the first transmission interface and the second transmission interface are universal asynchronous receiver transmitters (UART). The control program can be set into an inactive mode when the application program is executed. The switch module switches to a first state or a second state based on the priority settings of the application program and the control program. Besides, the switch module also can switch to a first state or a second state based on a general-purpose I/O (GPIO) port of the central processor. The control program drives the positioning module to enter into an inactive mode when the intensity of a satellite signal received by the positioning module is lower than a predetermined value. Besides, the control program enters into an inactive mode, if the power supply of the positioning system is low, or the positioning module has received sufficient positioning information, or the intensity of the satellite signal received by the positioning module is lower than a predetermined value.

Figure 2:
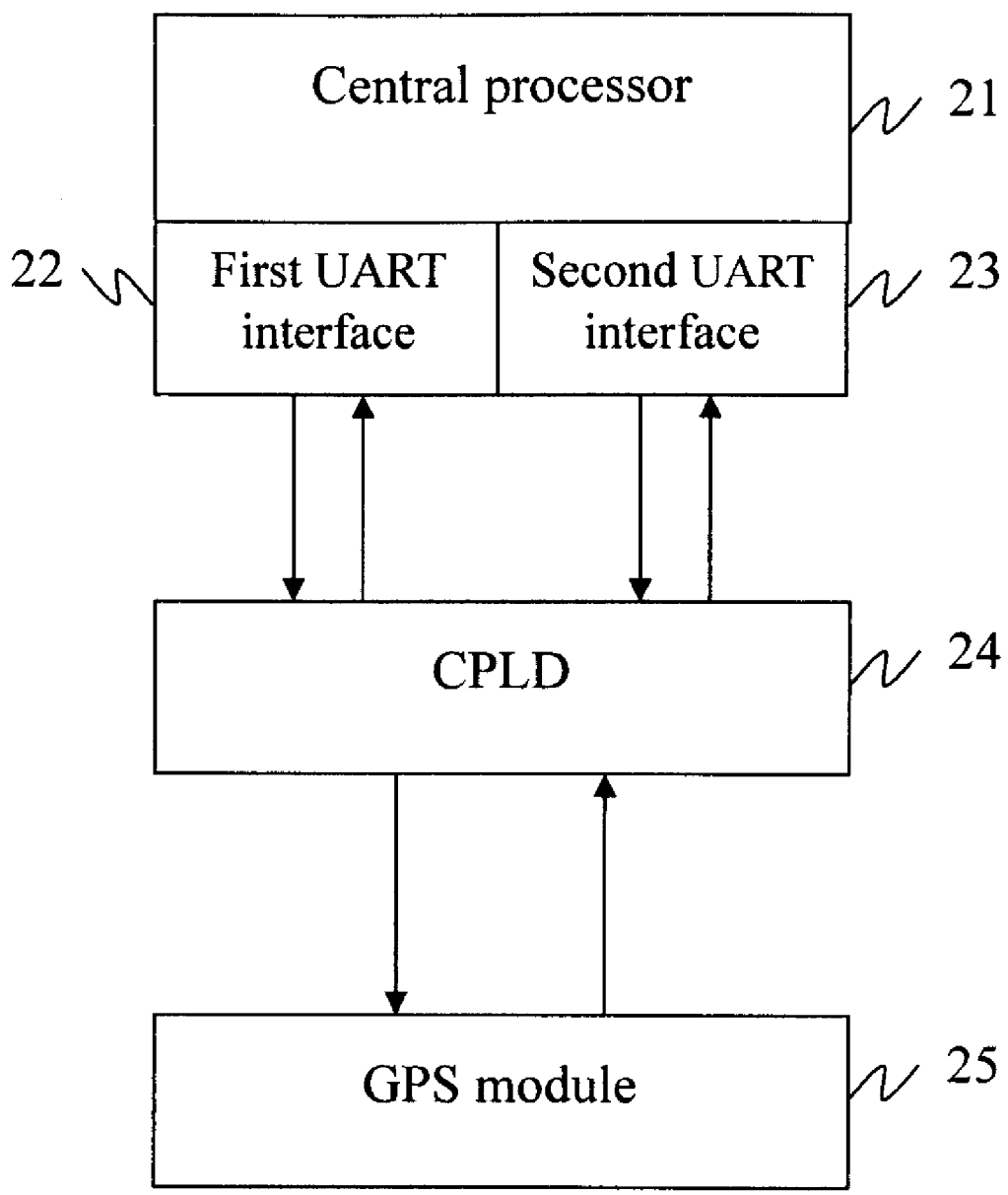
FIG. 2 is a block diagram of a positioning system in accordance with a preferred embodiment of the present invention.

Referring to FIG. 2 for a block diagram of a positioning system in accordance with a preferred embodiment of the present invention, the positioning system comprises a central processor 21, a first UART interface 22, a second UART interface 23, a complex programmable logic device (CPLD) 24 and a global positioning system module 25. The CPLD 24 is used as a switch circuit for switching between the first UART interface 22 and the second UART interface 23 of the central processor 21, and receiving the positioning information from the global positioning system module 25. The switching states of CPLD 24 can be controlled by a GPIO port of the central processor 21.

Figure 3:
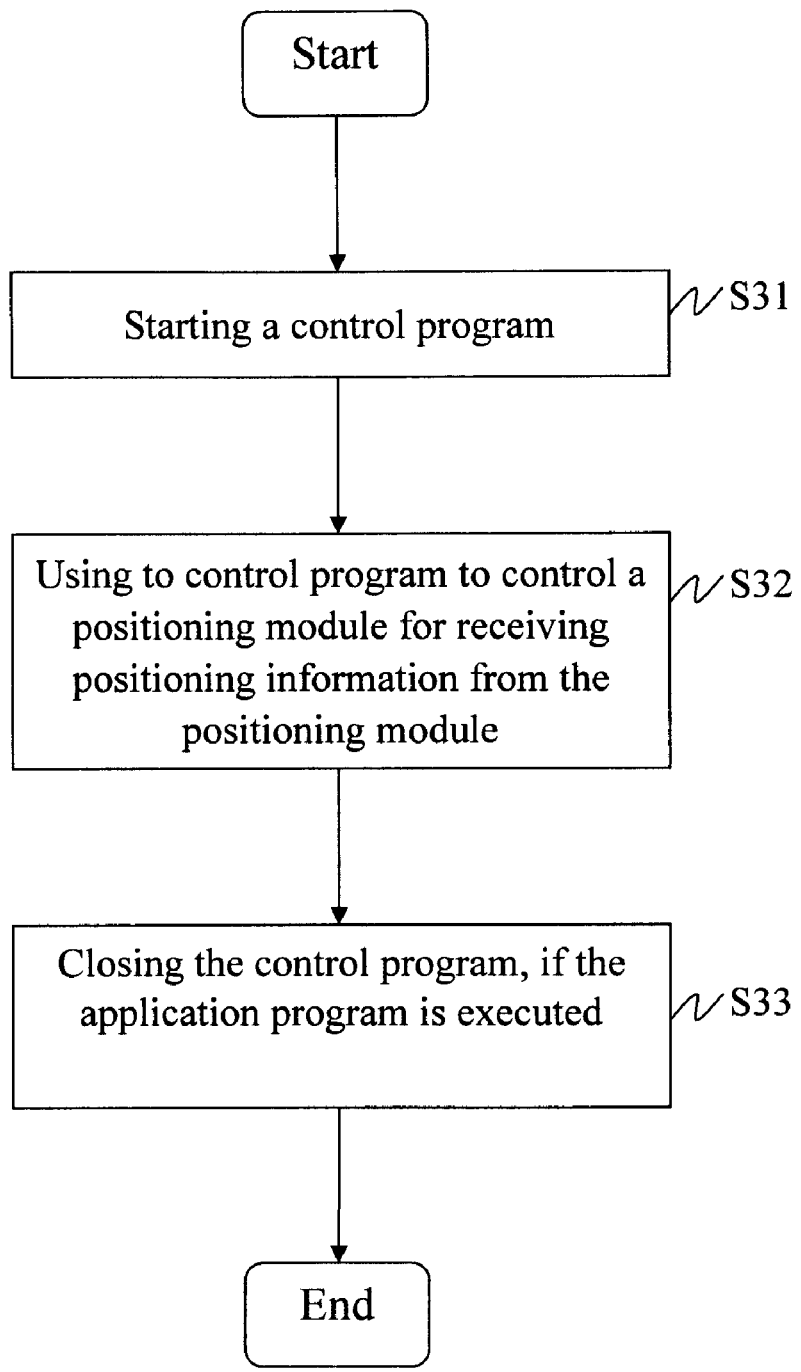
FIG. 3 is a flow chart of a control method of a positioning system in accordance with the present invention.

Referring to FIG. 3 for a flow chart of a control method of a positioning system in accordance with the present invention, the control method comprises the steps of:

Step S31: starting a control program;

Step S32: using the control program to control a positioning module for receiving a positioning information from the positioning module; and Step S33: terminating the control program, if an application program is executed.

Figure 4:
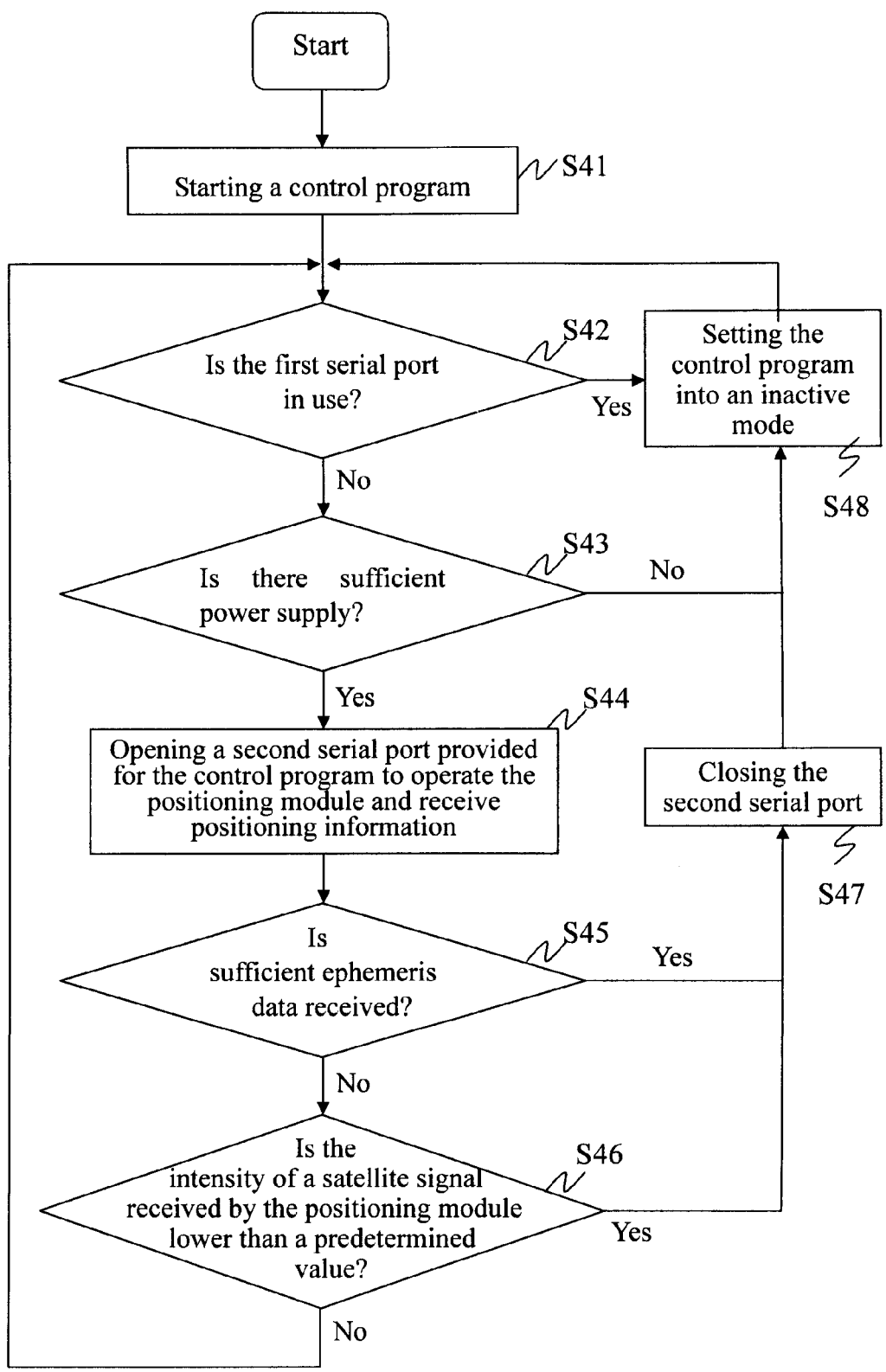
FIG. 4 is a flow chart of a control method of a positioning system in accordance with a preferred embodiment of the present invention.

Referring to FIG. 4 for a flow chart of a control method of a positioning system in accordance with a preferred embodiment of the present invention, the control method comprises the steps of:

Step S41: starting a control program;

Step S42: detecting whether or not the first serial port is in use; if yes, indicating that an application program is being executed, then go to Step S48, or else go to Step S43;

Step S43: detecting whether or not there is sufficient power supply; if no, indicating that the power supply is too low, then go to Step S48, or else go to Step S44;

Step S44: turning on a second serial port provided for the control program to access the positioning module for receiving positioning information;

Step S45: detecting whether or not sufficient ephemeris data is received; if yes, then execute Steps S47 and Step S48, or else go to Step S46;

Step S46: detecting whether or not the intensity of a satellite signal received by the positioning module is lower than a predetermined value; if yes, then executes Steps S47 and S48, or else repeat Step S42;

Step S47: turning off the second serial port; and

Step S48: setting the control program into an inactive mode.

Figure 5:
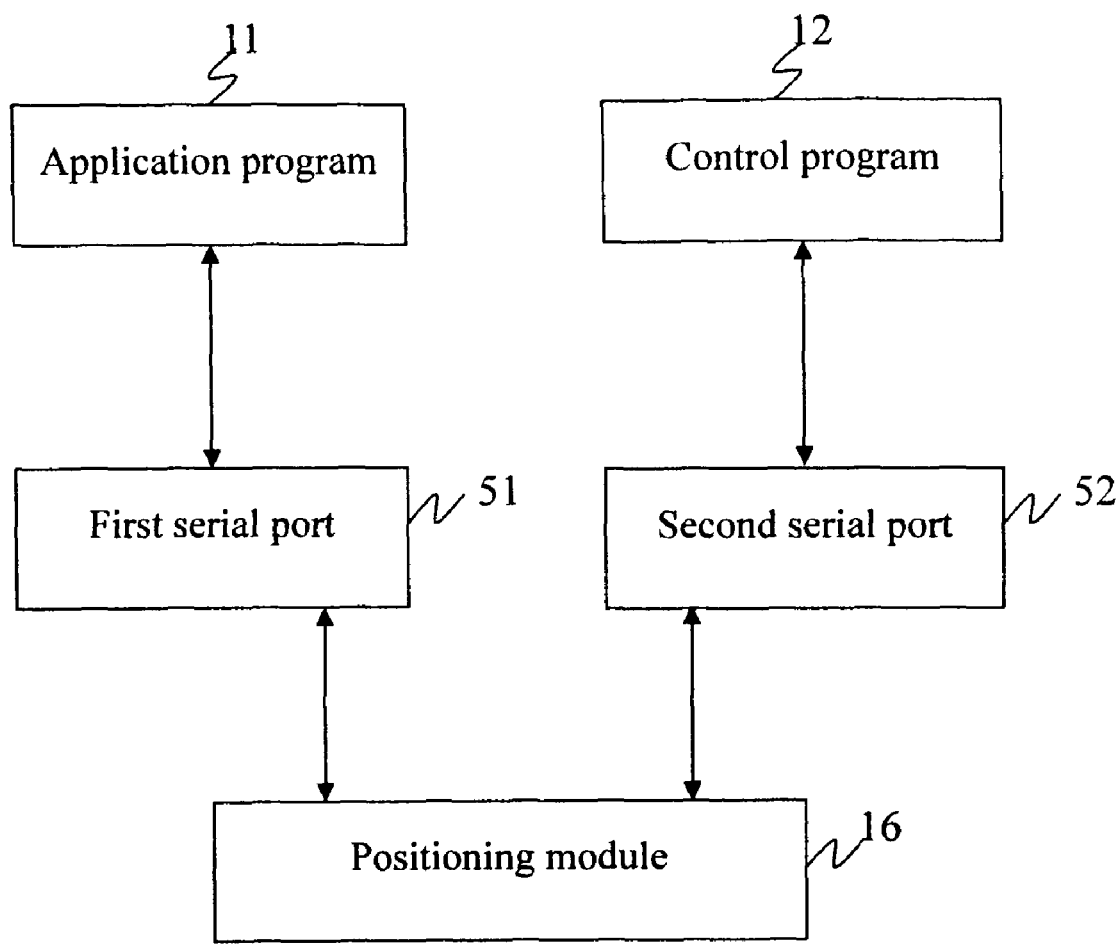
FIG. 5 is a block diagram of a positioning system software in accordance with a preferred embodiment of the present invention.

Please referring to FIG. 5 for a block diagram of a positioning system software in accordance with a preferred embodiment of the present invention, the positioning system comprises a positioning module 16, an application program 11, a control program 12, a first serial port 51 and a second serial port 52. The application program 11 is for controlling the positioning module 16, and the control program 12 is for controlling the positioning module 16 when the application program 11 is terminated. The application program 11 accesses the positioning module 16 through the first serial port 51, and the control program 12 accesses the positioning module 16 through the second serial port 52.

Since the application program and the control program adopt different serial ports, these two programs do not affect each other. Even if the control program turns on the second serial port, the first serial port can be turned on successfully without any interference when the application program tries to turn on the first serial port.

Figure 6:
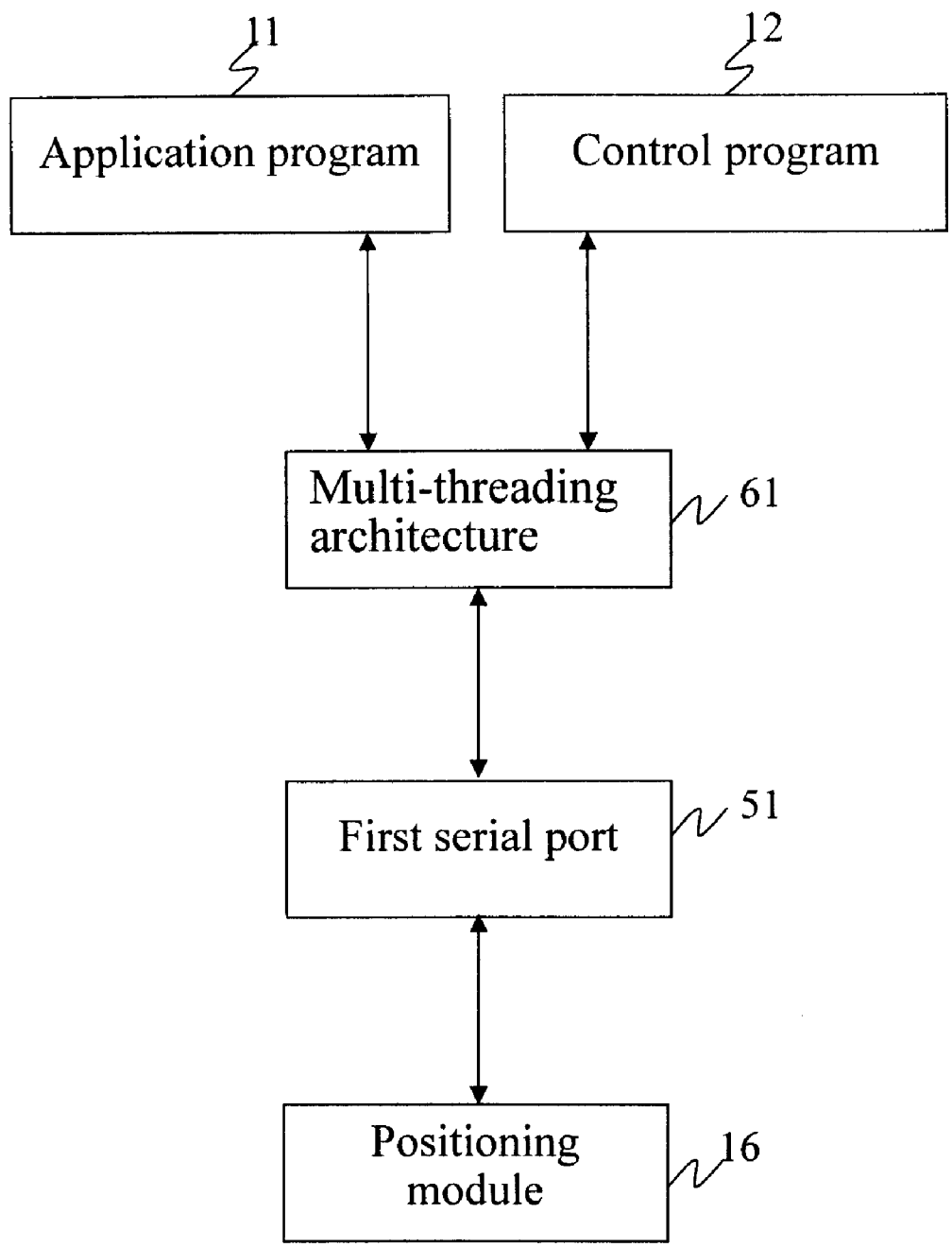
FIG. 6 is a block diagram of a positioning system software in accordance with another preferred embodiment of the present invention.

Please referring to FIG. 6 for a block diagram of a positioning system software in accordance with another preferred embodiment of the present invention, the position system comprises a positioning module 16, an application program 11, a control program 12 and a first serial port 51. The application program 11 is for controlling the positioning module 16, and the control program 12 is for controlling the positioning module 16 when the application program 11 is terminated, and both application program 11 and control program 12 can simply use a multi-threading architecture 61 to control the positioning module 16 through the first serial port 51.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A positioning system, comprising:

a positioning module being in communication with at least one satellite, said positioning module receiving positioning information including ephemeris data;

a switch module coupled to said positioning module and having a pair of outputs for switching said positioning information between said pair of outputs;

a first transmission interface coupled to a first of said pair of outputs of said switch module;

a second transmission interface coupled to a second of said pair of outputs of said switch module; and a central processor coupled to said first transmission interface for transmitting said positioning information received through said first transmission interface to a navigation application program responsive to said switch module coupling said positioning information to said first output, and said second transmission interface for transmitting said positioning information received from said second transmission interface to a control program responsive to said switch module coupling said positioning information to said second output;

wherein when the navigation application program is inactive, the control program controls the positioning module to receive the positioning information including the ephemeris data timely from the satellite through the positioning module;

wherein when the navigation application program is enabled, the control program is set into an inactive mode or an active mode, and the navigation application program receives the positioning information including the ephemeris data from the satellite through the positioning module, wherein said control program drives said positioning module into the inactive mode, if the intensity of a satellite signal received by said positioning module is lower than a predetermined value.

2. The positioning system of claim 1, wherein said positioning module is a global positioning system (GPS) module.

3. The positioning system of claim 1, wherein said first transmission interface and said second transmission interface are universal asynchronous receiver transmitter (UART) interfaces.

4. The positioning system of claim 1, wherein said switch module switches to said first state or said second state based on priority settings of said navigation application program and said control program.

5. The positioning system of claim 1, wherein said switch module switches to said first state or said second state based on a signal from a general-purpose I/O (GPIO) port of said central processor.

6. The positioning system of claim 1, wherein said control program is set into the inactive mode, if the power of said positioning system is low.

7. The positioning system of claim 1, wherein said control program is set into the inactive mode, if said positioning module has received sufficient positioning information.

8. The positioning system of claim 1, wherein said control program is set into the inactive mode, if the intensity of the satellite signal received by said positioning module is lower than the predetermined value.

9. A control method for a positioning system, comprising the steps of:

providing said positioning system having a navigation application and a control program;

starting said control program of said positioning system when said navigation program of said positioning system is inactive;

using said control program of said positioning system to control a positioning module, the positioning module being in communication with at least one satellite to receive positioning information therefrom, said positioning information including ephemeris data; and setting said control program into an inactive mode or an active mode, responsive to said navigation application program being started so as to enable the positioning module to be in communication with the satellite for receiving said positioning information including said ephemeris data, wherein said control program is executed according to a procedure comprising the steps of:

(a) detecting whether or not a first serial port is in use, wherein said first serial port is provided for said navigation application program to access a positioning module; if yes, then said control program is set into the inactive mode, or else go to Step (b);

(b) detecting whether or not there is sufficient power; if yes, go to Step (c), or else said control program is set into the inactive mode;

(c) opening a second serial port which is provided for said control program to access said positioning module to receive said positioning information;

(d) detecting whether or not sufficient ephemeris data is received; if yes, then close said second serial port to set said control program into the inactive mode, or else go to Step (e); and (e) detecting whether or not the an intensity of a satellite signal received by said positioning module is lower than a predetermined value; if yes, then close said second serial port to set said control program into the inactive mode.

10. A positioning system, comprising:

a central processor having a multi-threading architecture;

a positioning module being in communication with at least one satellite and receiving positioning information therefrom; said positioning information including ephemeris data;

a serial port coupled to said positioning module;

a navigation application program controlling said positioning module through said a serial port; and a control program controlling said positioning module through said serial port while said navigation application program is terminated;

wherein said central processor transmits said positioning information received through said multi-threading architecture to said navigation application program or said control program responsive to said multi-threading architecture coupling said positioning information to said serial port;

wherein when the navigation application program is inactive, the control program controls the positioning module to receive the positioning information including ephemeris data timely from the satellite through the positioning module;

wherein when the navigation application program is enabled, the control program is set into an inactive mode or an active mode, and the navigation application program receives the positioning information including the ephemeris data from the satellite through the positioning module, wherein said control program drives said positioning module into the inactive mode, if the intensity of a satellite signal received by said positioning module is lower than a predetermined value.

* * * * *